(12) United States Patent
Louie et al.

(10) Patent No.: US 7,574,501 B2
(45) Date of Patent: Aug. 11, 2009

(54) SYSTEM AND METHOD FOR CONFIGURING AND VIEWING AUDIT TRAILS IN AN INFORMATION NETWORK

(75) Inventors: David Gok Louie, Foster City, CA (US); Jai-Jein Yu, Fremont, CA (US); Deming Wu, Union City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 626 days.

(21) Appl. No.: 09/963,292

(22) Filed: Sep. 25, 2001

(65) Prior Publication Data

US 2007/0192478 A1 Aug. 16, 2007

(51) Int. Cl.
*G06F 15/173* (2006.01)

(52) U.S. Cl. ............... 709/224; 709/203; 709/245; 709/246; 707/1

(58) Field of Classification Search ......... 709/224, 709/223, 229, 202, 203, 212, 214, 201, 245, 709/246; 705/1, 51; 707/3, 102, 9; 717/126, 717/127; 719/318, 320, 312, 328, 330
See application file for complete search history.

(56) References Cited

U.S. PATENT DOCUMENTS

| | | | | |
|---|---|---|---|---|
| 3,914,578 A | * | 10/1975 | Bigelow et al. ............. 235/375 |
| 5,361,359 A | * | 11/1994 | Tajalli et al. ................ 713/200 |
| 5,557,742 A | * | 9/1996 | Smaha et al. ............... 713/200 |
| 5,581,749 A | * | 12/1996 | Hossain et al. .............. 707/10 |
| 5,596,700 A | * | 1/1997 | Darnell et al. .............. 715/512 |
| 5,649,196 A | * | 7/1997 | Woodhill et al. ........... 707/204 |
| 5,754,763 A | * | 5/1998 | Bereiter ...................... 726/28 |
| 5,758,150 A | * | 5/1998 | Bell et al. ................... 707/10 |
| 5,794,252 A | * | 8/1998 | Bailey et al. ............... 707/202 |
| 5,812,981 A | * | 9/1998 | Noguchi et al. ............. 705/1 |
| 5,813,009 A | * | 9/1998 | Johnson et al. ............ 707/100 |
| 6,029,144 A | * | 2/2000 | Barrett et al. ............... 705/30 |
| 6,056,786 A | * | 5/2000 | Rivera et al. .............. 717/168 |
| 6,065,118 A | * | 5/2000 | Bull et al. .................. 726/22 |
| 6,070,177 A | * | 5/2000 | Kao et al. .................. 715/500 |
| 6,134,664 A | * | 10/2000 | Walker ...................... 713/201 |
| 6,161,122 A | * | 12/2000 | Hawkes ..................... 709/203 |
| 6,216,164 B1 | * | 4/2001 | Zaremba, Jr. .............. 709/227 |
| 6,275,824 B1 | * | 8/2001 | O'Flaherty et al. .......... 707/9 |

(Continued)

*Primary Examiner*—Michael Won
(74) *Attorney, Agent, or Firm*—Campbell Stephenson LLP

(57) ABSTRACT

An audit trail system allows a user to configure and view an audit trail of changes that have been made to various types of information that can be accessed by one or more users in a network of computer systems. The various types of information are grouped in business components. A user can select particular business components, and fields within a business component, to be audited. The audit trail shows who has accessed the business component, the operation performed, when the operation was performed, and how the value of at least a portion of the business component was changed. Users can track when operations such as update, create, delete, and copy are performed on the selected business components, as well as track which employee modified a certain field and the data that has been changed. Users can also reconstruct records that existed at a certain point of time. Options to restrict access to audit trails by selected areas of responsibility, positions, and/or employee identifiers, can also be included. Audit trails can be written to one or more local files and periodically imported into a central database.

34 Claims, 11 Drawing Sheets

U.S. PATENT DOCUMENTS

| | | | |
|---|---|---|---|
| 6,289,460 B1 * | 9/2001 | Hajmiragha | 713/200 |
| 6,347,374 B1 * | 2/2002 | Drake et al. | 726/1 |
| 6,408,310 B1 * | 6/2002 | Hart | 707/201 |
| 6,411,969 B1 * | 6/2002 | Tam | 707/204 |
| 6,470,339 B1 * | 10/2002 | Karp et al. | 707/8 |
| 6,470,388 B1 * | 10/2002 | Niemi et al. | 709/224 |
| 6,574,729 B1 * | 6/2003 | Fink et al. | 713/1 |
| 6,587,857 B1 * | 7/2003 | Carothers et al. | 707/102 |
| 6,636,868 B1 * | 10/2003 | Bauer et al. | 707/104.1 |
| 6,775,827 B1 * | 8/2004 | Harkins | 717/130 |
| 6,834,304 B1 * | 12/2004 | Nisbet et al. | 709/224 |
| 6,836,750 B2 * | 12/2004 | Wong et al. | 702/186 |
| 6,839,850 B1 * | 1/2005 | Campbell et al. | 726/23 |
| 7,007,088 B1 * | 2/2006 | Najmi | 709/225 |
| 7,127,448 B1 * | 10/2006 | Wong | 707/2 |
| 7,246,137 B2 * | 7/2007 | Paulus et al. | 707/104.1 |
| 2001/0023486 A1 * | 9/2001 | Kayashima et al. | 713/200 |
| 2002/0026507 A1 * | 2/2002 | Sears et al. | 709/224 |
| 2002/0029194 A1 * | 3/2002 | Lewis et al. | 705/39 |
| 2002/0077972 A1 * | 6/2002 | Wilwerding et al. | 705/39 |
| 2002/0083059 A1 * | 6/2002 | Hoffman et al. | 707/9 |

* cited by examiner

407

Audit Trail Buscomp — 418

1 - 7 of 7+

| Buscomp | Restriction Type | Update | New | Delete |
|---|---|---|---|---|
| Service Request | No Restriction | ✓ | ✓ | ✓ |
| Agreement | No Restriction | ✓ | | ✓ |
| Order Entry - Orders | No Restriction | ✓ | ✓ | ✓ |
| Order Entry - Line It | No Restriction | ✓ | ✓ | ✓ |
| FS Invoice | No Restriction | ✓ | ✓ | ✓ |
| Incentive Compensa | No Restriction | ✓ | ✓ | ✓ |
| Incentive Compensa | No Restriction | ✓ | ✓ | ✓ |

407

Field | User | Position | Responsibility — 402

(New) (Save) 1 - 3 of 3

| Columns Displayed... | Ctrl+Shift+K |
| Advanced Sort... | Ctrl+Shift+O |
| Change Records | |
| Merge Records | |
| Import... | |
| Export... | |
| Select All | Ctrl+A |
| Invert Selection | |
| New Record | Ctrl+N |
| Edit Record | Ctrl+E |
| Save Record | Ctrl+S |
| Copy Record | Alt+C |
| Undo Record | Alt+U |
| Delete Record | Ctrl+D |
| New Query | Alt+Q |
| Run Query | Alt+ENTER |
| Refine Query | Alt+R |
| First Records | Alt+F |
| Last Records | Alt+L |

Audit Trail:

Show: [Audit Trail Items]

Audit Trail Item — 407

| Employee Login | Business Compo | Operation | Date | Record Id | Field | New Value | Old Value |
|---|---|---|---|---|---|---|---|
| SADMIN | Service Request | Modify | 8/31/2001 3:26:27 P | 1-16BRQ | Severity | 1-Critical | |
| SADMIN | Service Request | Modify | 8/31/2001 3:26:22 P | 1-16BRQ | Priority | High | Medium |
| SADMIN | Service Request | Modify | 8/31/2001 3:26:16 P | 1-16BRQ | Abstract | Computer does not l | |
| SADMIN | Service Request | Modify | 8/31/2001 3:26:16 P | 1-16BRQ | Sub-Status | In Process | Unassigned |
| SADMIN | Service Request | New Record | 8/31/2001 3:25:47 P | 1-16BRQ | Id | 1-16BRQ | |
| SADMIN | Service Request | Modify | 8/31/2001 3:25:41 P | 2-1CR | Status | Pending | Open |
| SADMIN | Service Request | Modify | 8/31/2001 3:25:32 P | 2-1CR | Abstract | System crashes w/ | |
| PTB_CCHE | Position | Delete | 8/25/2001 10:44:00 | 1-YH00 | Id | | 1-YH00 |
| PTB_CCHE | Position | Delete | 8/25/2001 10:44:00 | 1-YH00 | Compensation Credi | | |
| PTB_CCHE | Position | Delete | 8/25/2001 10:44:00 | 1-YH00 | IC Transaction Work | | |
| PTB_CCHE | Position | Delete | 8/25/2001 10:44:00 | 1-YH00 | IC Transaction Work | | |
| PTB_CCHE | Position | Delete | 8/25/2001 10:43:10 | 1-YGRH | Id | | 1-YGRH |
| PTB_CCHE | Position | Delete | 8/25/2001 10:43:10 | 1-YGRH | Compensation Credi | | |
| PTB_CCHE | Position | Delete | 8/25/2001 10:43:10 | 1-YGRH | IC Transaction Work | | |
| PTB_CCHE | Position | Delete | 8/25/2001 10:43:10 | 1-YGRH | IC Transaction Work | | |
| PTB_MSTE | Position | Delete | 8/25/2001 10:30:56 | 1-YH00 | Id | | 1-YH00 |
| PTB_MSTE | Position | Delete | 8/25/2001 10:30:56 | 1-YH00 | Compensation Credi | | |
| PTB_MSTE | Position | Delete | 8/25/2001 10:30:56 | 1-YH00 | IC Transaction Work | | |

SYSTEM AND METHOD FOR CONFIGURING AND VIEWING AUDIT TRAILS IN AN INFORMATION NETWORK

BACKGROUND

There is an increasing need to be able to track changes to information stored in computerized information networks that can be accessed by multiple users. Often, government regulations require certain information to be tracked to protect consumers. For example, banks and other financial institutions are required to track changes to accounts to protect customers and prevent fraud. Pharmacies and hospitals are required to track inventory levels of controlled substances, as well as the patient to whom the substances are dispensed, the dates the substances are dispensed, and the quantity of the substances dispensed.

Other requirements, aside from government regulations, also exist for providing the ability to track changes to information. For example, companies worldwide require the ability to track customer service requests, including the arrival date, the status of the request, the service representative handling the request, and the resolution date of the request.

These types of organizations typically have one or more enterprise application programs installed on servers administered by the organization. Each enterprise application program performs specific functions related to the organization, such as managing a customer service center, keeping track of bank accounts, and record-keeping for dispensing pharmaceutical drugs. Audit trails can be utilized in many other types of enterprise application programs to comply with government regulations, track performance, maintain database security, and document modifications for future analysis and record keeping.

Currently, audit trail functions are implemented in database management programs. Thus, a user must have access to the database to identify the tables, and the items in the tables, to be audited. With the growing use of application servers, enterprise servers, and shared database facilities, it is desirable to allow users to identify the items and operations to be audited from application programs on the servers. This would alleviate the need for the user to have knowledge of and access to the table structure in the database to configure audit trails.

It is also desirable to allow users to select an option to store the audit trails in local files on a server and import them to a central database at a later time. This option can improve performance by decreasing the number of accesses to the central database.

It is also desirable to provide a system for creating audit trails that allows users of an enterprise application program to specify which items of information and operations to audit. For example, the user may wish to track operations such as updates, creation, deletion, and copying of the designated items of information in the enterprise application program. The audit trail should document the information that changed, who made the change, when the change was made, the old value, and the new value.

It is further desirable to allow authorized users to activate and deactivate audit trails, to view audit trails, to query records in audit trails according to specified criteria, and to restore an item of information to a previous state. It is further desirable to allow an administrator to restrict audit privileges of users according to employee identifiers, responsibilities, and/or positions.

Additionally, it is desirable to automatically disable and/or remove any audit trail configurations that correspond to an item that was removed from an application program.

SUMMARY

An audit trail system in accordance with the present invention creates an audit trail of changes that have been made to various types of information that can be accessed by one or more users in a network of computer systems. An audit trail is a collection of records that show the history of an item including who has accessed an item, what operation was performed, when it was performed, and how the value was changed. Audit trails can be created to track the history of as many items as desired, and are useful for maintaining security, examining the history of a particular record, and documenting modifications for future analysis and record keeping. Further, once a system administrator performs a set-up procedure, the specified audit trail is created without requiring any interaction with, or input from, users.

Features of audit trails in accordance with the present invention allow users to track operations such as update, create, delete, and copy actions performed on designated items of information, which employee modified the item, and the data that has been changed.

Another feature of an audit trail system in accordance with the present invention includes reconstructing records that existed at a certain point of time through the use of queries.

An administrator can also set options to restrict the ability of a user to view and query the audit trails.

An audit trail can be written to one or more local files and periodically exported to a central database. Alternatively, an audit trail can be written directly to the central database thereby providing a current history of audit transaction records.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 4a is diagram of an example of a user interface for configuring a business component and business component fields to be audited in accordance with the audit trail system shown in FIG. 1a.

FIG. 4c is a diagram of an example a user interface for restricting audit trails to selected responsibilities, positions, and employees in accordance with the audit trail system shown in FIG. 1a.

FIG. 5a is a diagram of an example of a user interface for viewing the results of the audit trail in accordance with the audit trail system shown in FIG. 1a FIG. 5b is a diagram of an example of a user interface for showing the results of a query of audit trail information in accordance with the audit trail system shown in FIG. 1a.

The use of the same reference symbols in different drawings indicates similar or identical items.

DETAILED DESCRIPTION

Figure 1A:
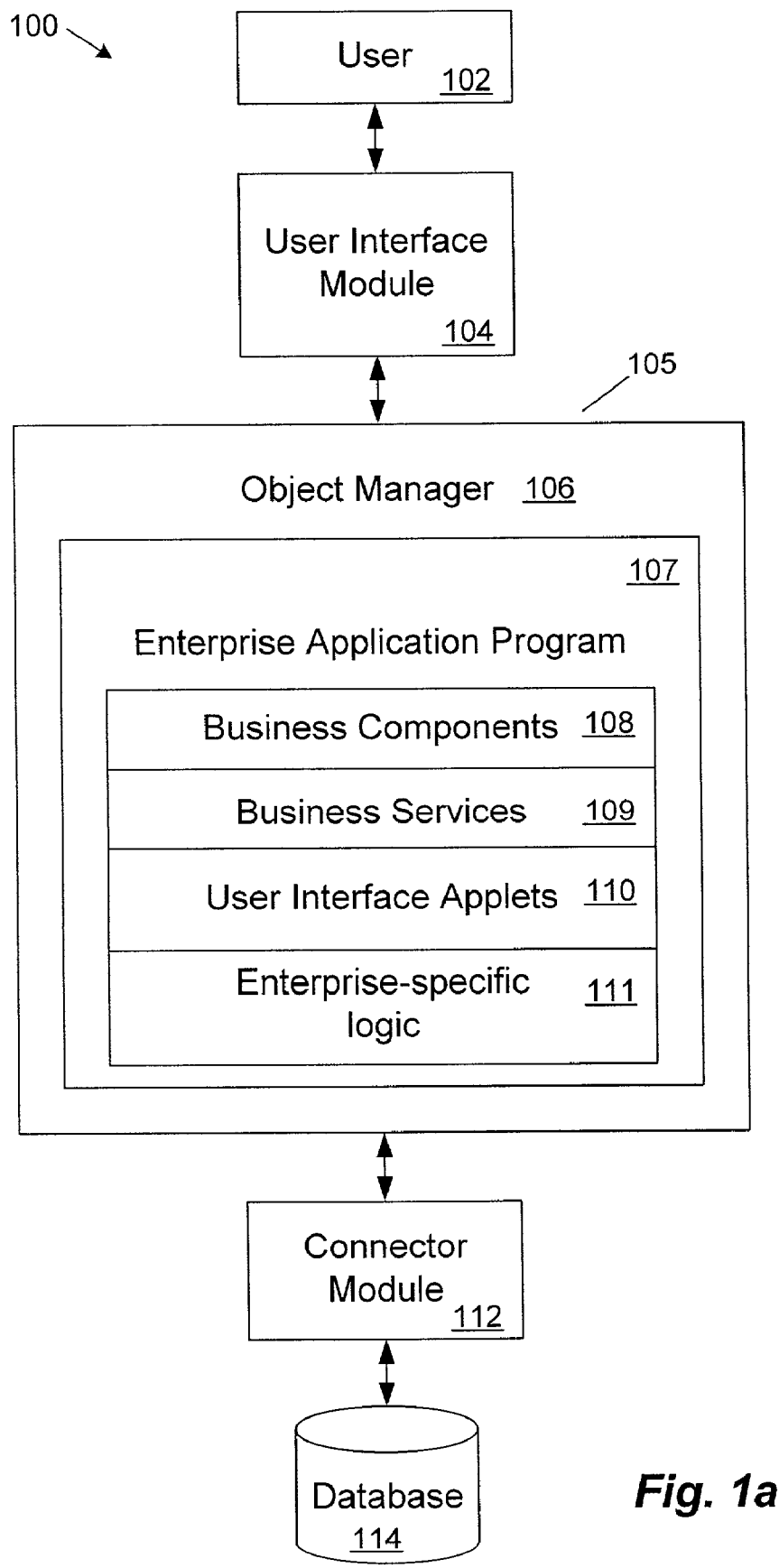
FIG. 1*a* is a block diagram of components included in an embodiment of an audit trail system in accordance with the present invention.

Referring to FIG. 1a, an embodiment of an audit trail system 100 in accordance with the present invention shows a user interface module 104 communicating with server 105. In the embodiment shown, components in server 105 include an object manager 106, one or more enterprise application programs 107, one or more business components 108, business services 109, user interface applets 110, and enterprise specific logic 111. Note that in other embodiments, the functions performed by these components can be rearranged in a greater or lesser number of components.

A user 102 with administrator privileges can enter information for creating an audit trail, such as business components 108 and fields within the selected business components 108, to be audited by invoking a particular enterprise application program 107 via the user interface module 104. Business components 108 and business services 109 coordinate to generate audit trails as specified by the user 102.

Audit trails comprise a collection of audit transaction records, also referred to as audit trail items. The audit transaction records can be stored on database 114 via connector module 112. Alternatively, the user 102 can select an option to write the audit trails to one or more files. The user 102 can then import the audit transaction records stored in the file into the database 114 at a later time. Batch import processes can be scheduled using workflow processes, as known in the art. The user 102 can also purge and archive audit trails in the database 114, typically by using commercially available database management facilities.

User interface applets 110 interact with business components 108, business services 109, and enterprise-specific logic 111 to generate the format and content of the information presented to the user 102 via the user interface module 104. The user 102 can also enter commands to view and query audit trails via user interface module 104. Note that user interface module 104 can present information in visual and/or audio formats.

Figure 1B:
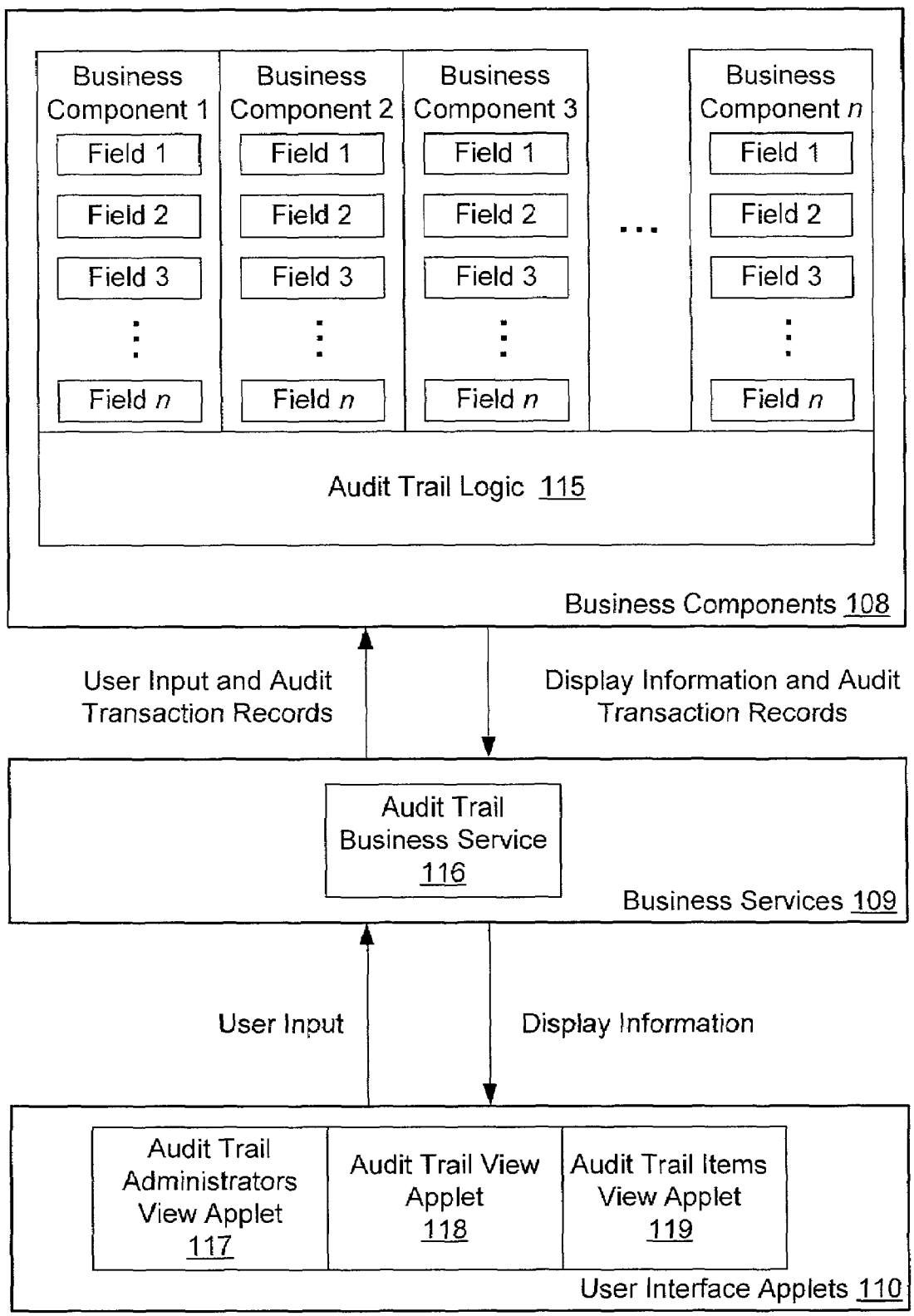
FIG. 1*b* is a block diagram of an example of components included in the business components, business services, and user interface applets of FIG. 1*a*.

Referring now to FIGS. 1a and 1b, business components 108 is shown with a plurality of business components (1-n), with each business component including a plurality of fields (1-n). Audit trail logic 115 can include an application program interface (API) for interfacing with enterprise application program 107, allowing the audit trail logic 115 to determine the business components 108 that can be audited in the enterprise application program 107. The audit trail logic 115 also receives notices of user actions from the user interface applets 110, and sends audit trail information to be displayed to the user to the user interface applets 110. A database business service (not shown) in business services 109 transmits audit trail records between the database 114 and the audit trail logic 115.

If the audit trail feature is enabled, the audit trail logic 115 detects when an audit event occurs for the fields being audited. The term "audit trail event" refers to an operation being performed on a business component 108, or a field within a business component 108, that is being audited.

A visual display of the business components 108 and their corresponding fields can be presented to the user via an audit trail administrators view applet 117. A user can select one or more fields in any of the business components 108 to be audited via the audit trail administrators view applet 117. The results of the audit trails can be viewed using an audit trail view applet 118 and an audit trail items view applet 119. The audit trail view applet 118 and the audit trail items view applet 119 also allow the user to query the results of one or more audit trails.

Figure 1C:
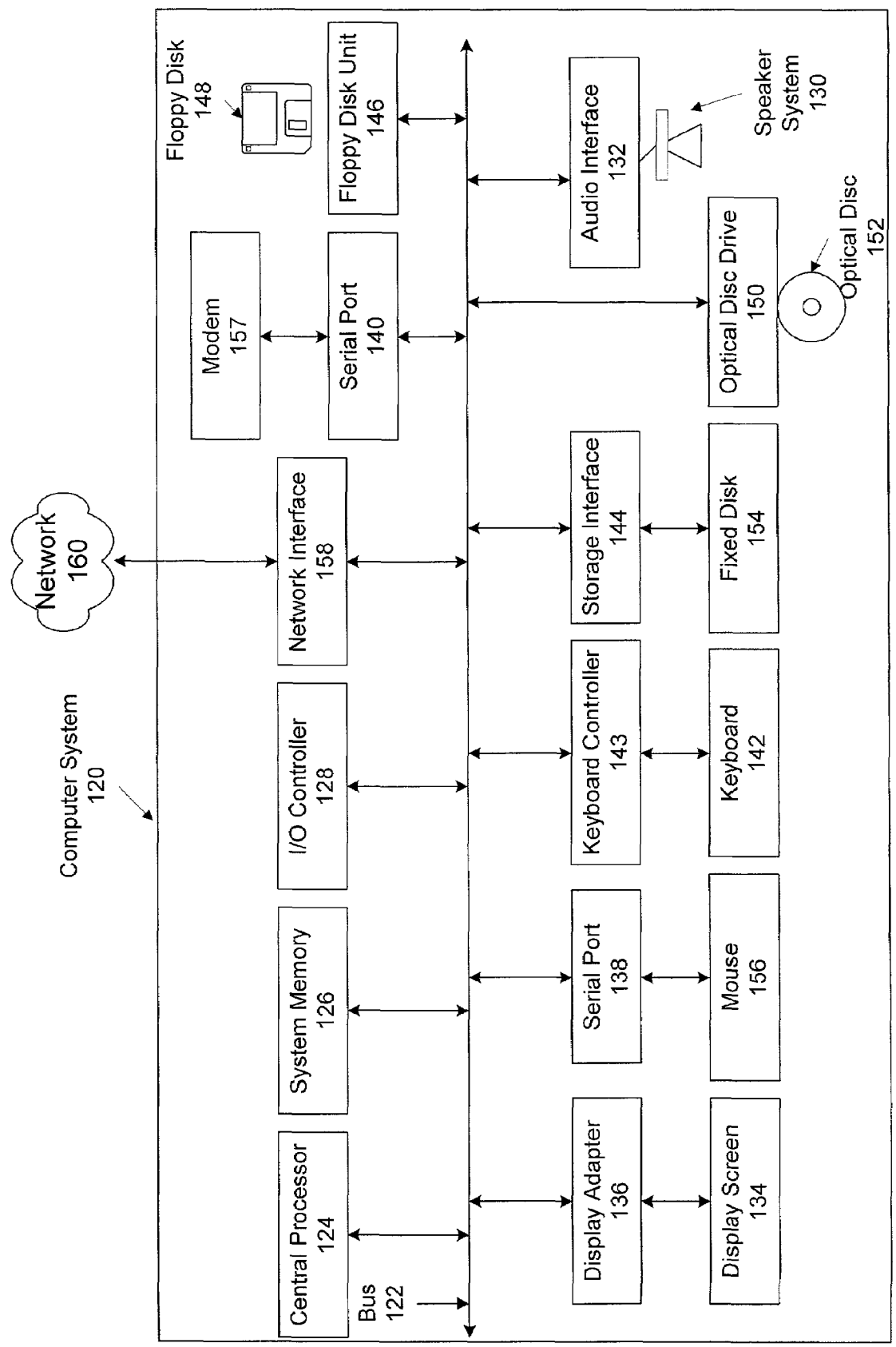
FIG. 1*c* is a block diagram of an example of a computer system suitable for implementing various embodiments of an audit trail system in accordance with the present invention.

FIG. 1c depicts a block diagram of a computer system 120 suitable for implementing the user interface module 104 and server 105. Computer system 120 includes a bus 122 which interconnects major subsystems of computer system 120 such as a central processor 124, a system memory 126 (typically RAM, but which may also include ROM, flash RAM, or the like), an input/output controller 128, an external audio device such as a speaker system 130 via an audio output interface 132, an external device such as a display screen 134 via display adapter 136, serial ports 138 and 140, a keyboard 142 (interfaced with a keyboard controller 143), a storage interface 144, a floppy disk drive 146 operative to receive a floppy disk 148, and an optical disc drive 150 operative to receive an optical disc 152. Also included are a mouse 156 (or other point-and-click device, coupled to bus 122 via serial port 138), a modem 157 (coupled to bus 122 via serial port 138) and a network interface 158 (coupled directly to bus 122).

Bus 122 allows data communication between central processor 124 and system memory 126, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 120 are generally stored on and accessed via a computer readable medium, such as a hard disk drive (e.g., fixed disk 154), an optical drive (e.g., CD-ROM drive 150), floppy disk unit 146 or other storage medium. Additionally, applications may be in the form of electronic signals modulated in accordance with the application and data communication technology when accessed via network modem 157 or network interface 158.

Storage interface 144, as with the other storage interfaces of computer system 120, may connect to a standard computer readable medium for storage and/or retrieval of information, such as a fixed disk drive 154. Fixed disk drive 154 may be a part of computer system 120 or may be separate and accessed through other interface systems. Many other devices can be connected such as the mouse 156 connected to bus 122 via serial port 138, a modem 157 connected to bus 122 via serial port 140 and the network interface 158 connected directly to bus 122. Modem 157 may provide a direct connection to a remote server via a telephone link or to the Internet via an internet service provider (ISP). Network interface 158 may provide a direct connection to a remote server, such as the server 105 (FIG. 1a) via a direct network link to the Internet via a POP (point of presence). Network interface 158 may provide such connection using various communication links, such as a dial-up wired connection with a modem, a direct link such as a T1, ISDN, or cable line, a wireless connection through a cellular or satellite network, or a local data transport system such as Ethernet or token ring over a local area network.

Many other devices or subsystems (not shown) may be connected in a similar manner (e.g., bar code readers, document scanners, digital cameras and so on). Conversely, it is not necessary for all of the devices shown in FIG. 1c to be present to practice the present invention. The devices and subsystems may be interconnected in different ways from that shown in FIG. 1c. The operation of a computer system such as that shown in FIG. 1c is readily known in the art and is not discussed in detail in this application. Code to implement the present invention may be stored in computer-readable storage media such as one or more of system memory 126, fixed disk 154, CD-ROM 152, or floppy disk 148. Additionally, computer system 120 may be any kind of computing device, and so includes personal data assistants (PDAs), network appliance, desktop, laptop, X-window terminal or other such computing device. The operating system provided on computer system 120 may be MS-DOS®, MS-WINDOWS®, OS/2®, UNIX®, Linux® or other known operating system. Computer system 120 also supports a number of Internet access tools, including, for example, an HTTP-compliant web browser having a JavaScript interpreter, such as Netscape Navigator® 3.0, Microsoft Explorer® 3.0 and the like.

Multiple computer systems 120 can be communicate with one another via a network 160. One or more of the computer systems 120 can be utilized to implement the user interface module 104 (FIG. 1a), while one or more of the computer systems 120 can be utilized to implement the server 105 (FIG. 1a).

Moreover, regarding the signals described herein, those skilled in the art will recognize that a signal may be directly transmitted from a first component to a second component, or a signal may be modified (e.g., amplified, attenuated, delayed, latched, buffered, inverted, filtered or otherwise modified) between the components. Although the signals of the above described embodiment are characterized as transmitted from one component to the next, other embodiments of the present invention may include modified signals in place of such directly transmitted signals as long as the informational and/or functional aspect of the signal is transmitted between components. To some extent, a signal input at a second component may be conceptualized as a second signal derived from a first signal output from a first component due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Referring again to FIGS. 1a and 1b, enterprise application program 107 can be unique to an organization, and an organization can have more than one enterprise application program 107. For example, retail organizations can have an enterprise application program 107 for a customer service center that routes service requests to customer service representatives, tracks the amount of time required for each agent to handle each request, allows agents to route requests to other agents, and tracks the status of each agent and each request. As another example, an enterprise application program 107 for a financial institution may keep track of customer accounts including ownership information and account history, such as dates and amounts of deposits, withdrawals, interest earned, service fees, and balances. As another example, an enterprise application programs 107 for a sales organization may track sales leads and opportunities including the name and location of the prospect, the date of last contact, and other information relevant to the type of sales being made.

In some embodiments, a business component 108 is a table, or record, of information for an item, person, or other entity. The number, type, and information associated with the business components 108 varies depending on the functions performed by enterprise application program 107. Examples of business components 108 for various enterprise application programs 107 include accounts for banking enterprise application programs 107, sales opportunities or leads for marketing enterprise application programs 107, and service representatives in customer service center enterprise application programs 107. The structure and information fields for each business component 108 can be provided and installed in database 114, and/or created and updated by the user 102 through the user interface module 104 and enterprise-specific logic 111.

Once a business component 108 detects an audit event, the business component 108 invokes an audit trail business service 116 to create the file containing the audit trail items, to write a new audit transaction record to the audit trail business component 108, and to associate this file with the audit transaction record. Each business component 108 can have its own audit trail business service 116, or several business components 108 can share the same audit trail business service 116. The business services 109 stay active as long as the object manager 106 is active.

In some situations, writing to the database 114 can require more time than writing audit transaction records directly to files on the server 105 or on the computer system hosting the user interface module 104. In one embodiment, these files are uploaded to the file system when the object manager 106 closes normally. If the object manager 106 stops running due to an error condition, the business services 109 keeps track of the audit trail files that have been imported to the database 114 and uploads any files that have not been uploaded the next time the particular business service 109 is executed.

In some embodiments, an audit trail can include the following information: the business component 108, the field(s) within the business component 108, a database row identifier of the record being changed, the operation performed (update/new/delete/copy), the original value, the changed value, an identifier of the user performing the operation, and the date and time the operation was performed. In other embodiments, other information can be recorded in the audit transaction records in addition to, or instead of, the foregoing list.

Connector module 112 provides an interface between server 105 and database 114, thereby allowing enterprise application programs 107 developed by multiple, different parties to interface with the database 114. The connector module 112 transforms generic requests to perform database functions into queries that are recognized by the database 114.

Disconnected users can use the audit trail system 100 as well as connected users. The term "disconnected" refers to users who are currently not connected to the database 114, but rather to a local database (not shown). Data from the local database is uploaded to the database 114 when the user connects to the database 114. Logic in the business components 108 can stamp audit trail events with local machine time. Audit trails are synchronized or replicated along with other data in the database 114. If the transaction is rejected during the conflict resolution, the corresponding audit transaction record will not be discarded.

In some embodiments, a user 102 with administrator privileges can control the operation of audit trail functions in the business services 109, such as starting and stopping recording of audit transaction records, and importing audit trail files to the database 114. One way to control the audit trail functions is to use a new or existing workflow process, and create a business service 109 that implements the stop or the start audit trail methods.

Figure 2:
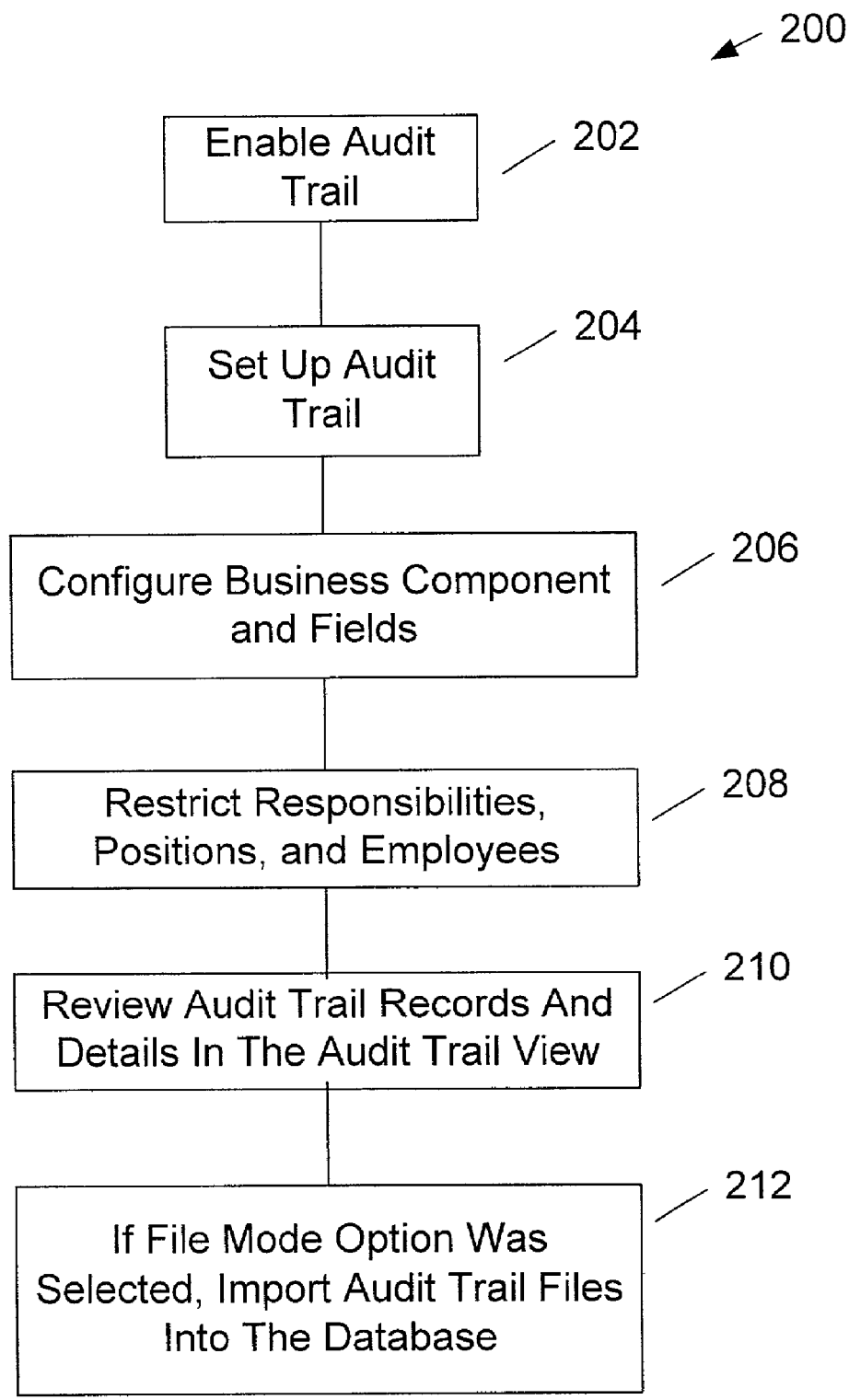
FIG. 2 is a flowchart diagram for setting up an audit trail for the audit trail system shown in FIG. 1*a*.

Referring now to FIGS. 1a and 2, FIG. 2 shows a flowchart diagram of an audit trail configuration process 200 for setting up an audit trail in the audit trail system 100. The audit trail configuration process 200 can be performed interactively via the user interface module 104. Alternate methods for providing setup information can also be used, such as providing files that include setup information for access by server 105, or through a workflow process.

In process 202, the user 102 with administrative privileges can enable or disable audit trail functions for one or more of the business components 108. In some embodiments, audit trails can be created only for business components 108 in a particular class. The user 102 can determine whether a particular business component 108 can generate audit trails by verifying the class that defines the particular business component 108.

In process 204, the user 102 sets up the audit trail. In some embodiments, the audit trails must be enabled in both the enterprise application program 107 and the business services 109. An object explorer feature can be included in object manager 106 to allow the user 102 to invoke a particular enterprise application program 107 via the user interface module 104, and to access the objects, such as business components 108, applets 110, and business services 109, within the enterprise application program 107. In some embodiments, the user 102 provides the name of the business service 109 to be used for audit trails, and sets parameters to invoke the audit trail methods in the enterprise application. Alternatively, the information to enable the audit trails can be provided in a configuration file, as discussed above.

Figure 3:
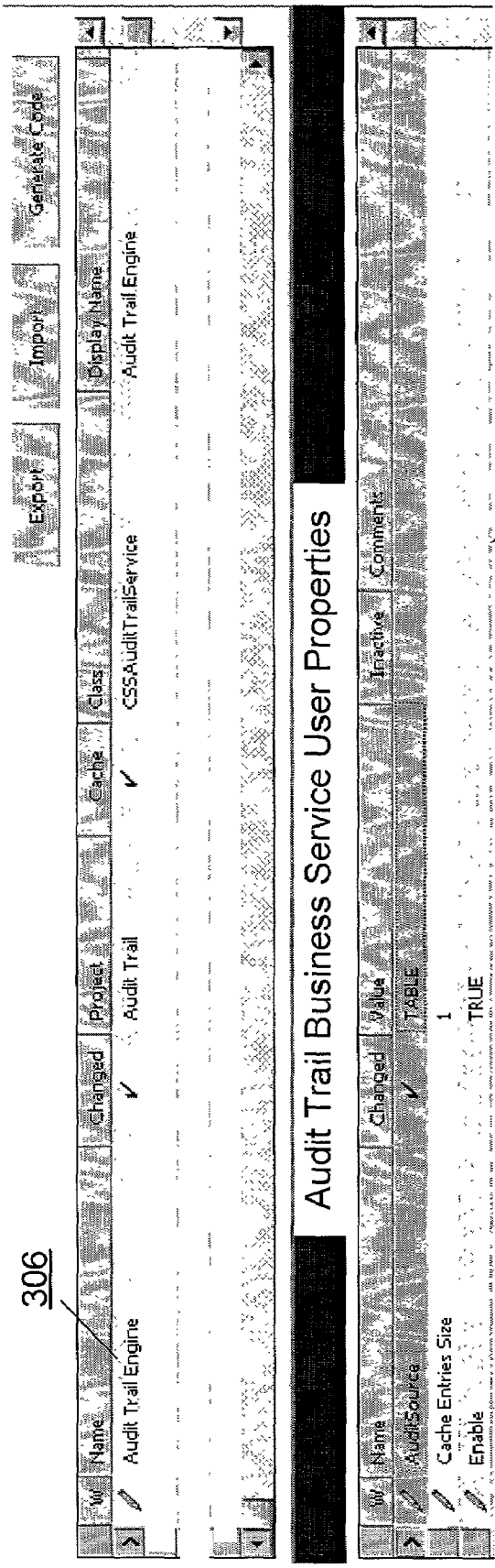
FIG. 3 is a diagram of an example of a user interface for setting up an audit trail in accordance with the flowchart diagram shown in FIG. 2.

Referring now to FIGS. 1b and 3, in some embodiments, the audit trails must also be enabled in the audit trail business service 116. FIG. 3 shows an example of an interactive display 300 for enabling audit trails in the business services 109. The display includes a business services frame 302, and a user property objects frame 304, which can be presented to the user 102 via the user interface module 104.

The user can select the audit trail engine business service 306 in the business services frame 302. The user properties corresponding to the audit trail engine business service 306 are shown in frame 304. In the example shown, the user properties for the audit trail engine business service 306 include a parameter for selecting the audit source, which refers to whether audit transaction records are written to a file on the server 105 or to a table in the database 114.

Another user property object shown in frame 304 is the size of the cache entries, which indicates the number of records to cache before writing the audit trail records for the selected mode. For example, if this field is set to 10 and the audit trail is running in the file mode, then one file will be created after 10 audit transactions are recorded for a particular business component 108. When running in the database mode, the value can be set to 1 since performance does not improve by increasing this value.

Another user property shown in frame 304 is "enable", which allows a user to control whether the audit trail is generated. For example, when the user sets "enable" to "true", audit trails are enabled. When "enable" is set to "false", audit trails are disabled.

Figure 4A:
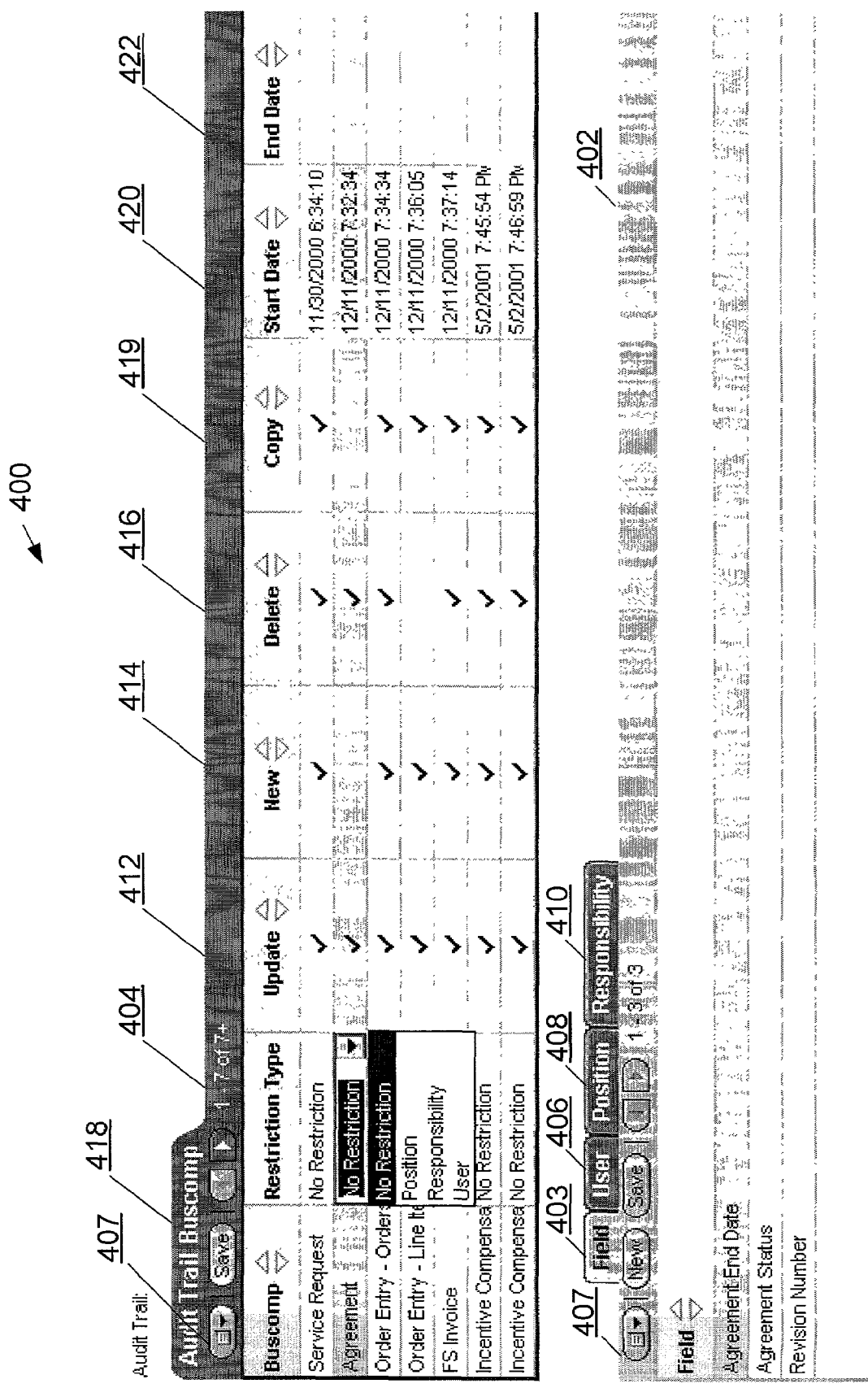

Referring now to FIGS. 1a, 2, and 4a, process 206 allows the user 102 to configure the business component(s) 108 and fields within each business component 108 to be audited. In some embodiments, the user interface module 104 can present an administrator display 400 such as shown in FIG. 4a that allows the user 102 to configure business components 108 by selecting fields and operations to be audited, and to restrict access to audit trails by employee identifiers, responsibilities, or positions for a selected field.

Figure 4B:
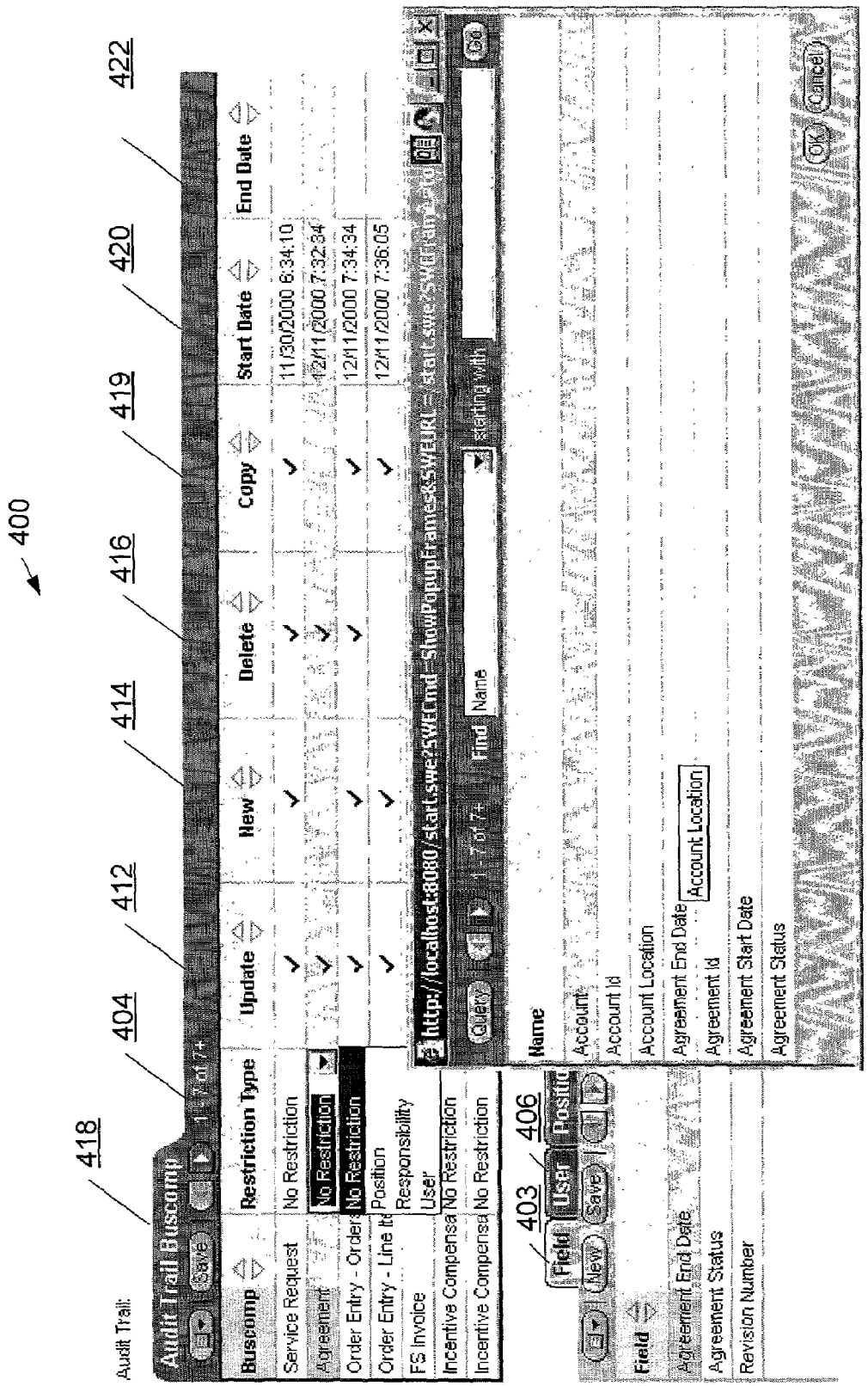
FIG. 4b is a diagram of an example of a pop-up frame that can be included in the user interface of FIG. 4a to allow the user to select fields to be audited.

Referring to FIGS. 4a and 4b, an example of an implementation for allowing the user 102 to enter fields to be audited is provided by field option 403. When the field option 403 is selected, frame 402 displays a list of the fields to be audited, if any, that have been entered for the business component selected in the audit trail business component frame 418. The user can choose a "new" option to enter a new field. In one embodiment, a pop-up frame 405 showing a list of fields included in the selected business component is presented. The user can scroll and/or search the list of fields, and select the fields to be audited. The selected fields then appear in frame 402.

Notably, the audit trail logic 115 (FIG. 1b) can review the existing audit trail configurations and determine whether the business component, and the fields of the business component to be audited, are still included in the application program 107. If not, the corresponding audit trail can be disabled or removed.

Referring now to FIG. 4c, frames 418 and 402 include a pull-down menu option 407. When the pull-down menu option 407 is selected, a menu 409 is presented that allows the user to perform several different types of functions including changing the columns presented in the frames 418, 402, sorting the entries in the frames, changing, merging, importing, exporting, selecting, inverting, creating, editing, saving, copying, undoing changes to, and deleting records, and querying records. Functions that are not available in the current context of use can be shown in a faded font to indicate that the function will not be performed if selected. Further, the same or different functions can be shown for each menu 409. Other implementations for invoking the functions can also be provided in one or more other ways known in the art such as when the right button on a mouse is selected.

Once the list of fields is entered in frame 402, the user 102 can enter further information to set up the operations, responsibilities, positions, and employees to be audited for the fields.

Regarding operations to be audited, in the example implementation shown in FIG. 4a, the user 102 can select an update option 412 to create an audit transaction record when the value of the corresponding field is updated. A "new" option 414 can be selected to create an audit transaction record when the corresponding record is created. A "delete" option 416 can be selected to create an audit transaction record when the corresponding record is deleted. A "copy" option 419 can be selected to create an audit transaction record when the corresponding record is copied. An indicator, such as a check mark, can be shown when the user selects an operation to be audited for a business component by selecting a corresponding area on the frame 418. Selecting an indicator deselects auditing of the operation for the business component 108 and causes the indicator to be removed from the display.

Figure 4D:
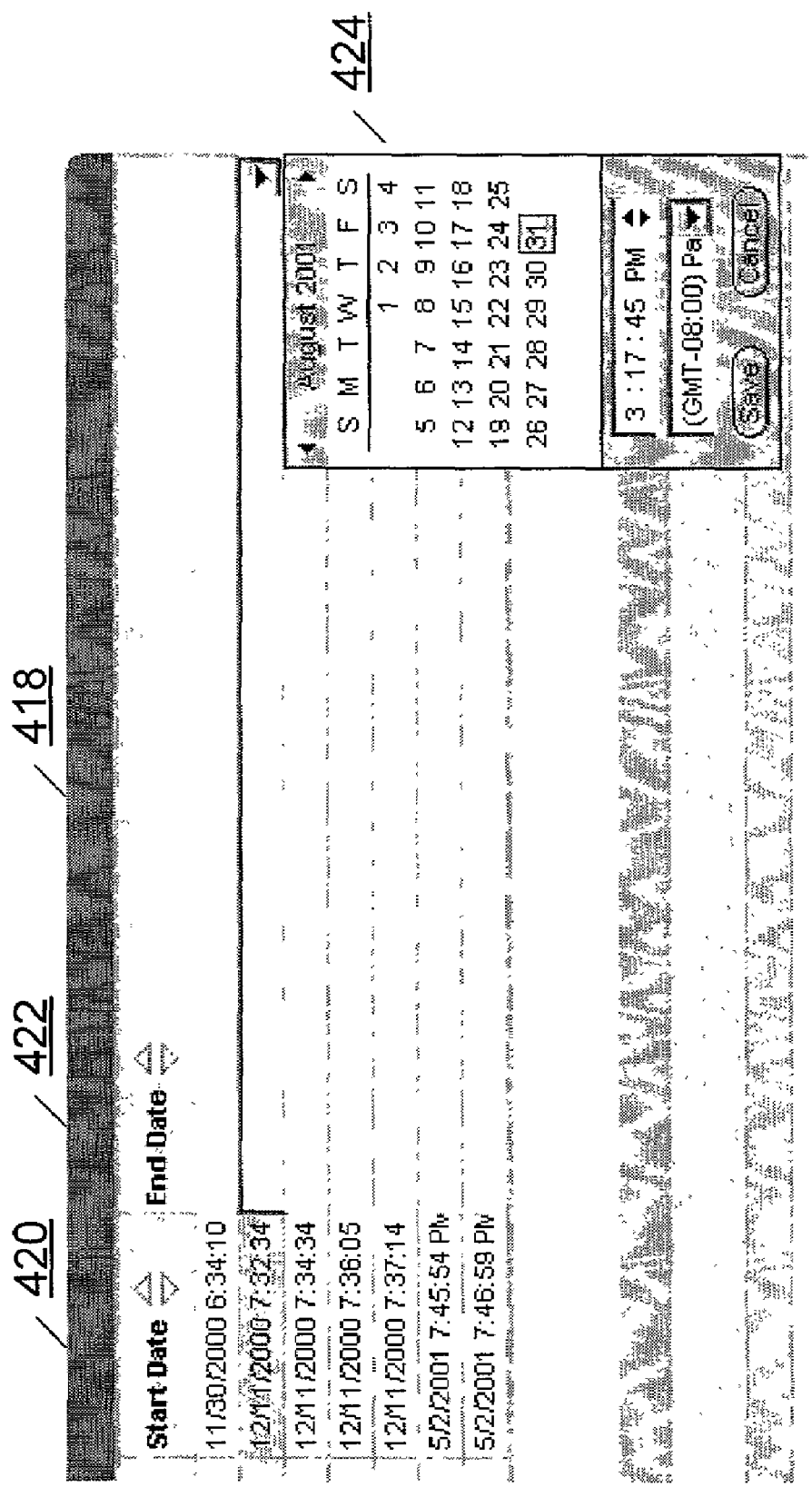
FIG. 4d is a diagram of an example of a pop-up frame that can be included in the user interface of FIG. 4a to allow the user to enter dates and times for starting and ending an audit.

Another feature that can be included in the audit trail system 100 (FIG. 1a) is to allow the user to specify a time period for starting and stopping an audit trail. The start date option 420 allows the user 102 to specify the date on which the auditing starts. The end date option 422 allows the user 102 to specify the date on which the auditing stops. FIG. 4d shows an example of a pop-up date/time frame 424 that can be presented when the user selects the start date option 420 or the end date option 422. Other ways of entering a date and time can also be implemented. Note that an audit trail can be turned off for a business component 108 (FIG. 1a) by setting the end date to a date that has already passed.

Referring now to FIGS. 1, 2, 4a, process 208 includes restricting access to the audit trails. In the example displays shown in FIGS. 4a and 4b, the restriction type column 404 shows whether there is a rule determining who can access the audit trails for each business component listed. In some embodiments, restrictions to the audit trails can be specified according to employee identifiers, responsibilities, or positions using a pull-down menu. Note that other options for restricting access to the audit trails can be provided in addition, or instead of, the restriction types shown in FIG. 4a.

In the example display shown in FIG. 4a, the user 102 can select a restriction option, including user option 406, position option 408, or responsibility option 410. When one of the restriction options 406, 408, or 410 are selected, frame 402 shows a corresponding display that allows the user 102 to identify the employees, positions, and responsibilities, respectively, that are allowed to access the audit trails. The restriction type column 404 shows the type of restriction currently set for the business components shown. Additionally or alternatively, a pop-up frame can be presented, similar to the fields pop-up frame 405 shown in FIG. 4b, that, depending on the option 406, 408, 410 selected, lists the employees (users), positions, or responsibilities that can access the audit trails.

In process 210, the user 102 can verify that an audit trail has been configured as intended. In some embodiments, the user 102 can select an audit trail view option, as shown for example in FIG. 5a from a view option menu 506. From the audit trail view, the user 102 can determine whether there is a new record showing the changes that were made to the business component, and verify that the audit trail was created. At this point, the user 102 can return to the administrator view 400 and add more fields to be audited. The user 102 can also change the option to write audit trails to a file or to the database 114 (FIG. 1a) at this point.

Figure 5A:
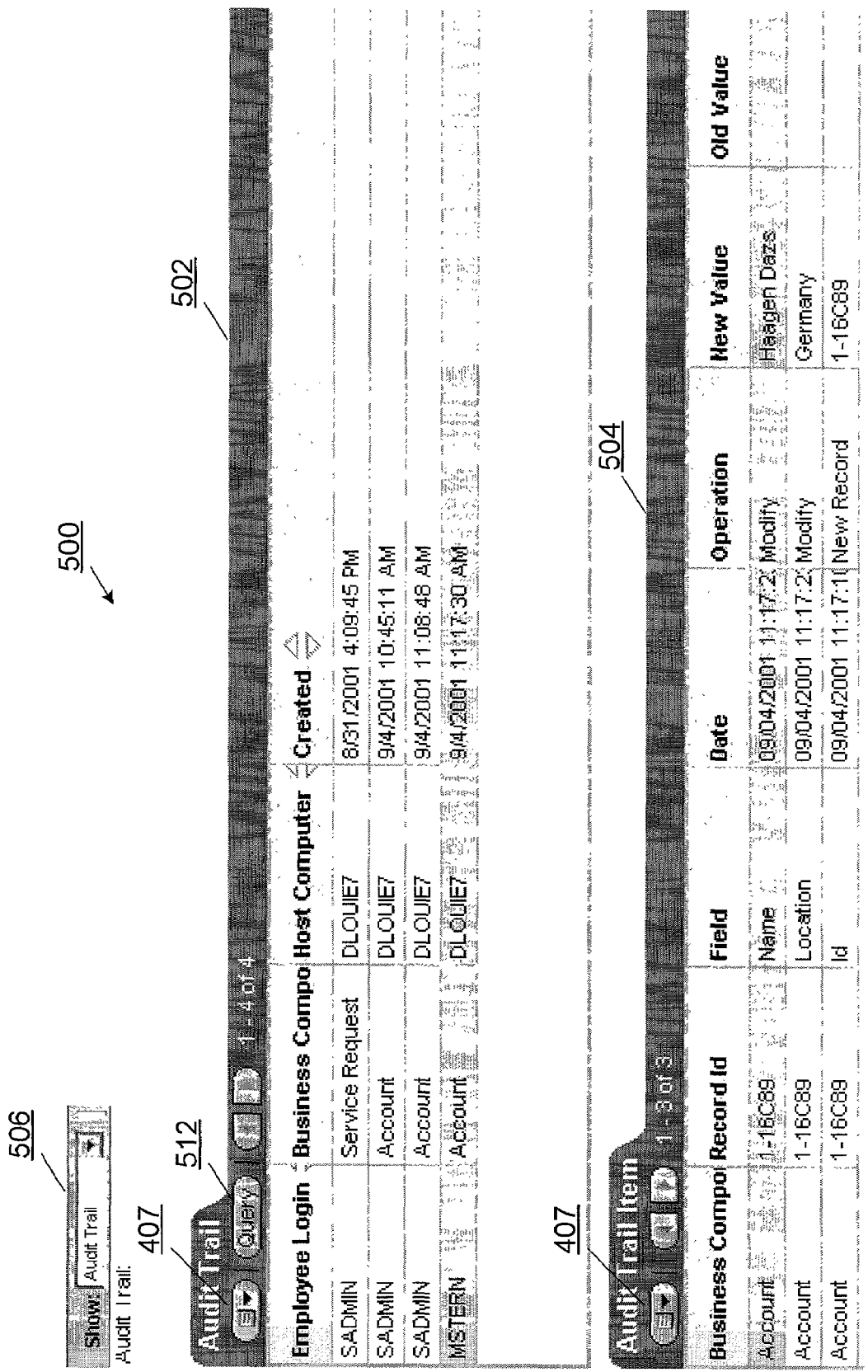

After the user 102 has set up one or more audit trails, a list of the audit trails, and the audit transaction records for the audit trails can be viewed by the users 102 that have privileges to access the audit trails. FIG. 5a shows an example of an audit trail view 500 that includes an audit trail frame 502 for displaying a list of audit trails, and an audit trail item frame 504 for displaying audit transaction records for the audit trail selected in the audit trail frame 502.

Audit trail view 500 also includes the audit trail option 506, which allows the user to select between various views including the audit trail view 500, the administrators view 400, and an audit trail item view. FIG. 5b shows an example of the audit trail item view 510. The audit trail item view 510 is similar to the display in the audit trail item frame 504 in FIG. 5a, however, the audit trail item view 510 displays more information in the audit transaction records for the selected audit trail.

The audit trail view 500 can also include facilities for querying the selected audit trail. For example, a query 512 is provided in the audit trail view 500. When the user 102 selects the query option 512, the user can enter the keywords to be queried from a pull-down menu or by entering the information in an edit window. The audit transaction records for the selected audit trail that match the query are displayed in audit trail item frame 504.

Referring again to the example in FIG. 5a, the list of audit trails in audit trail frame 502 includes the business component audited, the host computer that generated the audit trail, the date the audit trail was created, an indicator of whether the audit trail was imported from a file to the database 114 (FIG. 1a), the identifier of the employee who created the audit trail, and the start date of the audit trail.

The audit trail item frame 504 presents some of the information in the audit transaction records for the audit trail selected in the audit trail frame 502. The example audit trail item frame 504 shown in FIG. 5a includes the business component, an identifier of the audit transaction record, the field audited, the date/time the audit event occurred, the operation performed, the new value of the field, and the old value of the field. Other information in the audit transaction records can be displayed instead of, or in addition to, the information shown.

The example audit trail item view 510 shown in FIG. 5b includes an identifier of the employee who performed the operation that triggered the audit event, the business component, the operation performed, the date/time of the audit event, an identifier for the audit transaction record, the field audited, the new value of the field, and the old value of the field.

Note that the audit trail view 500 and the audit trail item view 510 are not comprehensive until all of the audit transaction records are imported from the files. In the embodiment shown, the user 102 can manually import the audit transaction records for the selected audit trail into the database 114 by selecting the import function from the pull-down menu option 407.

Note also that in some embodiments, the audit transaction records can be imported automatically on a periodic basis or when the application program 107 is shut-down or restarted. The user can view the audit transaction records on a file-by-file basis before they are imported to the database 114.

As an example of how an audit trail can be queried, assume a field, such as the address of a contact, has been accidentally deleted from a "contact" business component 108. Assume it is known when it was deleted. To find out who deleted it, the user can query the audit transaction records for the contact business component audit trail using the day the record was deleted. The user can browse through the set of records returned in response to the query to determine the identity of the employee who deleted the address.

Various embodiments of the audit system 100 in accordance with the present invention create audit trails of the changes that have been made to various types of information that can be accessed by one or more users in a network of computer systems. The audit trails can be configured to show the history of an item including who has accessed an item, what operation was performed, when it was performed, and how the value was changed. Audit trails can be created to track the history of as many items as desired, and are useful for maintaining security, examining the history of a particular record, and documenting modifications for future analysis and record keeping. Further, once a system administrator performs a set-up procedure, the specified audit trail is created without requiring any interaction with, or input from, users.

Thus, the application program 107 includes functions to configure audit trails, to generate audit transaction records and transmit them to an external database or a local file, and to view and query the audit trail configurations and transaction records in the application program. Including these functions in the application program 107 offers the advantage of being able to add, delete, and/or modify audit trail configurations independently of the database 114. Further, when new business components are added to the application program 107, the user can readily configure another audit trail for one or more of the fields in the new business component using the administrators view 400. The user therefore does not need to know the table structure in the database 114 to audit the new business component, as required in previously known auditing systems.

Additionally, if a business component is removed from an application program, or an audited field is removed from a business component, the audit trail logic 115 can automatically disable and/or delete any audit trail configurations that were created for the missing business component or field.

In addition to features discussed hereinabove, audit trails can be configured to record the values of the fields other than the fields selected for auditing. Also, a user can navigate to the audit trail item view 600 by selecting a field from a menu or tool bar presented by the user interface module 104 (FIG. 1a). Another feature can be implemented to force the user to enter a comment or note to document updates to fields as they are being entered. Another feature allows the user or administrator to reverse one or more audit transaction records to a prior state. Yet another feature can be implemented to include a merge operation as a combination of the update, delete, and create operations.

The foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof.

The present invention has been described in the context of a fully functional computer system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as media storage and distribution systems developed in the future.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention as set forth in the following claims.

We claim:

1. An apparatus comprising:
   an application program comprising
      one or more business components, wherein a business component comprises one or more fields, wherein the fields correspond to records in a database, and the database is separate from the application program,
      means for selecting for auditing a business component from the one or more business components,
      means for selecting for auditing one or more selected operations of a plurality of operations, wherein
         the selected operations include one or more of: update, add, copy, and delete,
         the operations are configured to operate on the selected business component, and
         the means for selecting for auditing one or more selected operations is further configured to exclude one or more operations of the plurality of operations from auditing,
      means for creating an audit trail for the application program, and
      means for providing the audit trail to the database associated with the fields of the business component.

2. The apparatus of claim 1, wherein the application program further comprises:
   means for detecting when the selected operations are performed.

3. The apparatus of claim 2, wherein the application program further comprises:
   means for generating an audit transaction record regarding the business component in response to detecting the selected operations.

4. The apparatus of claim 1, further comprising means for restricting access to the audit trail by at least one of: an employee identifier, an employment position, and an area of responsibility.

5. The apparatus of claim 3, further comprising means for storing the audit transaction record in an external database.

6. The apparatus of claim 3, further comprising means for storing the audit transaction record in a file.

7. The apparatus of claim 6, wherein the means for providing the audit trail comprising means for importing the audit transaction record stored in the file to the database.

8. The apparatus of claim 3, wherein the audit transaction record includes at least one of: an identifier for the entity that accessed the business component, the operation that was performed on the business component, when the operation was performed, and how the value of at least a portion of the business component was changed.

9. The apparatus of claim 3, further comprising means for querying one or more of the audit transaction records.

10. The apparatus of claim 2, further comprising means for prompting a user to enter a comment in response to detecting the selected operations.

11. The apparatus of claim 1, wherein the one or more business components further comprise a plurality of fields, and the apparatus further comprising:
   means for selecting a selected field of the plurality of fields to be audited, wherein the means for selecting a selected field is further configured to exclude one or more fields of the plurality of fields from auditing; and
   means for generating an audit transaction record when one of the selected operations on the selected field is detected.

12. The apparatus of claim 11, further comprising means for restoring the selected field to a previous state.

13. A system comprising:
a processor; and
a memory coupled to the processor and storing
   a first set of instructions, executable by the processor, configured to provide a business component, wherein the business component comprises one or more fields, wherein
      the fields correspond to records in a database, and the database is separate from the application program,
   a second set of instructions, executable by the processor, configured to provide a user interface, wherein
      the user interface is configured to allow selection for auditing of a selected field of the one or more fields and one or more selected operations on the selected field, wherein the selected operations include one or more of: update, add, copy, and delete, and is further configured to allow selection for excluding from auditing one or more selected operations,
   a third set of instructions, executable by the processor, configured to detect when the selected operations are performed on the selected field,
   a fourth set of instructions, executable by the processor, configured to generate an audit transaction record regarding the selected field in response to detecting the selected operations, and
   a fifth set of instructions, executable by the processor, configured to provide the audit transaction record to the database associated with the fields of the business component.

14. The system of claim 13, wherein the second set of instructions are further configured to allow a user to restrict access to an audit trail by at least one of: an employee identifier, an employment position, and an area of responsibility.

15. The system of claim 13, wherein the memory further stores a sixth set of instructions, executable by the processor, configured to store the audit transaction record in a file.

16. The system of claim 15, wherein the memory further stores a seventh set of instructions, executable by the processor, configured to import the audit transaction record stored in the file to the database.

17. The system of claim 13, wherein the audit transaction record includes at least one of: an identifier for the entity that accessed the field, the operation that was performed, when the operation was performed, and a previous value of the field, and a current value of the field.

18. The system of claim 13, wherein the memory further stores a sixth set of instructions, executable by the processor, configured to allow a user to query one or more of the audit transaction records.

19. The system of claim 13, wherein the memory further stores a sixth set of instructions, executable by the processor, configured to allow a user to restore one or more of the selected fields to a previous value.

20. The system of claim 13, wherein the memory further stores a sixth set of instructions, executable by the processor, configured to prompt a user to enter a description of the operation in response to detecting the selected operations.

21. A method comprising:
auditing an application program wherein said auditing comprises creating an audit trail; and
using the application program to perform audit trail functions comprising
   generating a list of business components included in the application program, wherein
      a business component of the list of business components comprises one or more fields, wherein
         the fields correspond to records in a database, and the database is separate from the application program,
   presenting the list of business components to a user,
   allowing the user to select for auditing a selected business component,
   presenting a list of operations that can be performed on the selected business component to the user, wherein the selected operations include one or more of: update, add, copy, and delete,
   allowing the user to select for auditing one or more selected operations for the selected business component,
   allowing the user to exclude from auditing one or more selected operations for the selected business component, and
   providing the audit trail to the database associated with the fields of the business component.

22. The method of claim 21, further comprising restricting access to the audit trail by at least one of: an employee identifier, an employment position, and an area of responsibility.

23. The method of claim 21, further comprising:
detecting when the selected operations are performed on the selected business component; and
generating an audit transaction record in response to detecting the selected operations.

24. The method of claim 23, wherein said providing the audit trail comprises storing the audit transaction record in the database.

25. The method of claim 23, further comprising storing the audit transaction record in a file.

26. The method of claim 25, wherein said providing the audit trail comprises importing the audit transaction record stored in the file to a database.

27. The method of claim 23, wherein the audit transaction record includes at least one of: an identifier for the entity that accessed the business component, the operation that was performed on the business component, when the operation was performed, and how the value of at least a portion of the business component was changed.

28. The method of claim 23, further comprising querying one or more of the audit transaction records.

29. The method of claim 23, further comprising prompting the user to enter a description of the operation in response to detecting the selected operations.

30. The method of claim 21, wherein the selected business component further comprises one or more fields, and the method further comprising:
selecting a selected field of the one or more fields to be audited; and
generating an audit transaction record in response to detecting the selected operations.

31. The method of claim 30, further comprising restoring one or more of the selected fields to a previous value.

32. A computer-readable storage medium comprising:
instructions for implementing the method of claim 21.

33. The apparatus of claim 1 wherein the application further comprises:
means for selecting the audit trail, wherein the audit trail is configured to be selected repetitively;
means for enabling the audit trail, subsequent to selecting the audit trail, wherein the audit trail is configured to be enabled repetitively; and
means for disabling the audit frail, subsequent to selecting the audit frail, wherein the audit trail is configured to be disabled repetitively.

34. The apparatus of claim 1, wherein
the business component comprises a table which includes information for an item, person, or other entity.

* * * * *

UNITED STATES PATENT AND TRADEMARK OFFICE
CERTIFICATE OF CORRECTION

| | | |
|---|---|---|
| PATENT NO. | : 7,574,501 B2 | Page 1 of 1 |
| APPLICATION NO. | : 09/963292 | |
| DATED | : August 11, 2009 | |
| INVENTOR(S) | : David Gok Louie et al. | |

It is certified that error appears in the above-identified patent and that said Letters Patent is hereby corrected as shown below:

On page 2, in column 1, under "U.S. Patent Documents", line 1, delete "713/200" and insert -- 726/28 --, therefor.

In column 3, line 17, delete "1a" and insert -- 1a. --, therefor.

In column 14, line 60, in claim 33, delete "frail," and insert -- trail, --, therefor.

In column 14, line 61, in claim 33, delete "frail," and insert -- trail, --, therefor.

Signed and Sealed this

Sixth Day of July, 2010

David J. Kappos
*Director of the United States Patent and Trademark Office*